United States Patent [19]

Knoll et al.

[11] Patent Number: 4,849,099

[45] Date of Patent: Jul. 18, 1989

[54] PARTICLE FEEDING APPARATUS

[75] Inventors: Frank S. Knoll; Arnold H. Jackson, both of Jacksonville, Fla.

[73] Assignee: Carpco, Inc., Jacksonville, Fla.

[21] Appl. No.: 944,970

[22] Filed: Dec. 22, 1986

[51] Int. Cl.$^4$ .............................................. B07B 1/46
[52] U.S. Cl. ................................ 209/127.1; 209/231
[58] Field of Search .............. 209/127.1, 127.2, 127.3, 209/129, 244, 245, 231, 246, 254, 219, 212, 213; 222/529, 534, 537; 198/536, 537

[56] References Cited

U.S. PATENT DOCUMENTS

| | | | |
|---|---|---|---|
| 1,866,781 | 7/1932 | Ullrich | 209/231 |
| 2,080,977 | 5/1937 | Albrecht | 209/246 |
| 4,231,861 | 11/1980 | Hannie et al. | 209/246 |
| 4,421,148 | 12/1983 | Knoll et al. | 222/534 |

Primary Examiner—Joseph F. Peters, Jr.
Assistant Examiner—Edwin L. Swinehart
Attorney, Agent, or Firm—Arthur G. Yeager

[57] ABSTRACT

Apparatus for receiving particulate product, spreading the particles in a thin layer, and feeding them to a surface of an electrostatic separator, comprising a hopper with a slot discharge opening above a vibrating inclined distribution plate over which the particles are distributed and move to a lower edge where they fall into the feed end of a substantially vertical chute which is capable of discharging the particles at a selected velocity in a generally horizontal direction, the particles passing through the hopper discharge slot being controlled by an adjustable gate to provide uniform feed to the distribution plate and to control the feed rate into the chute, the chute being adjustable to control velocity of particles leaving the chute, and the direction of discharge from the chute, and a bypass conduit to selectively conduct particles directly from the hopper to a point of discharge which avoids the vibrating plate and the vertical chute.

24 Claims, 4 Drawing Sheets

PARTICLE FEEDING APPARATUS

BACKGROUND OF THE INVENTION

There are many occasions in today's industrial world where granular or particulate material contains some specific materials which must be separated from the general mass of granules or particles. For example, ores, scrap material of mixed components, etc. have some valuable components and some waste material. It is, of course, important to recover the valuable components. One method of treating such materials to effect a separation is by electrostatic means, wherein the mixed particles are passed into or near an electrostatic field which attracts some types of materials while not affecting other types. By appropriate placement of the field and of collectors to catch particles falling by gravity, a separation can be made between particles more or less affected by the electrostatic field. A typical apparatus for accomplishing such a separation is described in U.S. Pat. No. 3,998,727 to Gifford. In order for such separation procedures to function efficiently there is a need for sophisticated feeding devices which can transform a mass of particles into a thin moving sheet of particles which can be passed into an electrostatic field which has access to each particle. One such feeding apparatus is described in U.S. Pat. No. 4,421,148 to Knoll and Jackson.

It is an object of this invention to provide an improved apparatus for feeding particles to an electrostatic separation device. It is another object of this invention to provide a novel apparatus for transforming a solid mass of particles into a thin moving sheet of particles travelling at a selected speed and positioned to be fed to the surface of a rotating drum. Other objects will become apparent from the more detailed description which follows.

BRIEF SUMMARY OF THE INVENTION

This invention relates to a particle feeding apparatus for an electrostatic separator comprising a hopper with an elongated discharge slot opening in the bottom thereof, an inclined distribution plate having an upper portion coextensive with and positioned adjacently below said discharge opening and a lower portion spaced outwardly and downwardly from said upper portion, an adjustable gate adjacent said discharge opening to meter the flow of particles onto said upper portion of said distribution plate, and adjustable substantially vertical chute to receive particles from said lower portion of said distribution plate and dispense said particles in a generally horizontal direction onto a surface subjected to electrostatic separation forces, and means to vibrate said plate in a direction perpendicular to the substantially downward vertical movement of particles down said plate.

In specific embodiments of the invention there are two distribution plates with their upper portions under the discharge opening of the hopper and with the plates inclining downward in opposite directions, an adjustable gate for each plate, and an adjustable vertical chute for each plate, thus providing two separate dispensing locations to feed two separate electrostatic separators. In other embodiments the gate is adjustable at spaced locations to provide a fine adjustment of the gate edge.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
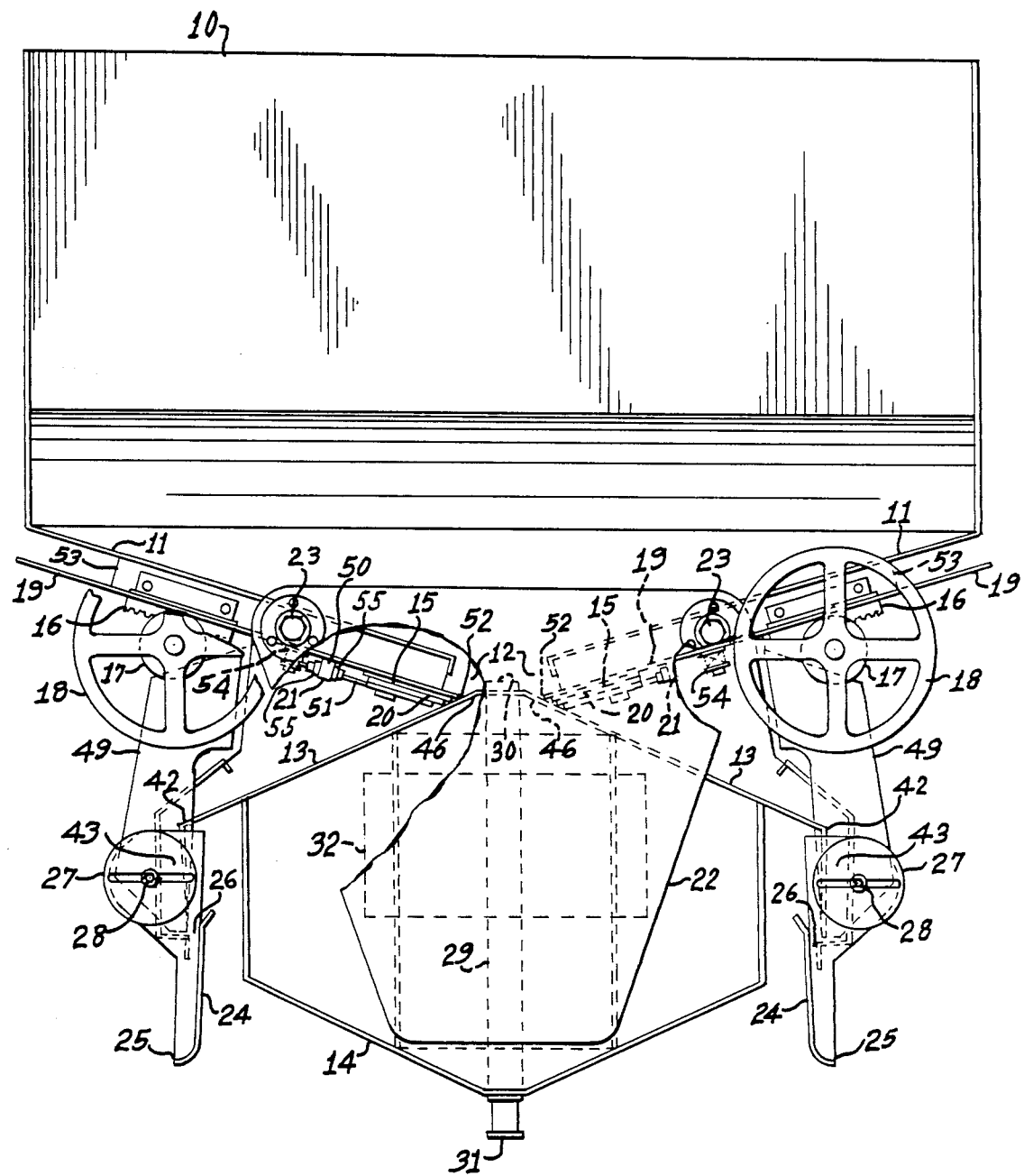
FIG. 1 is an end elevational view of the apparatus of this invention.
Figure 2:
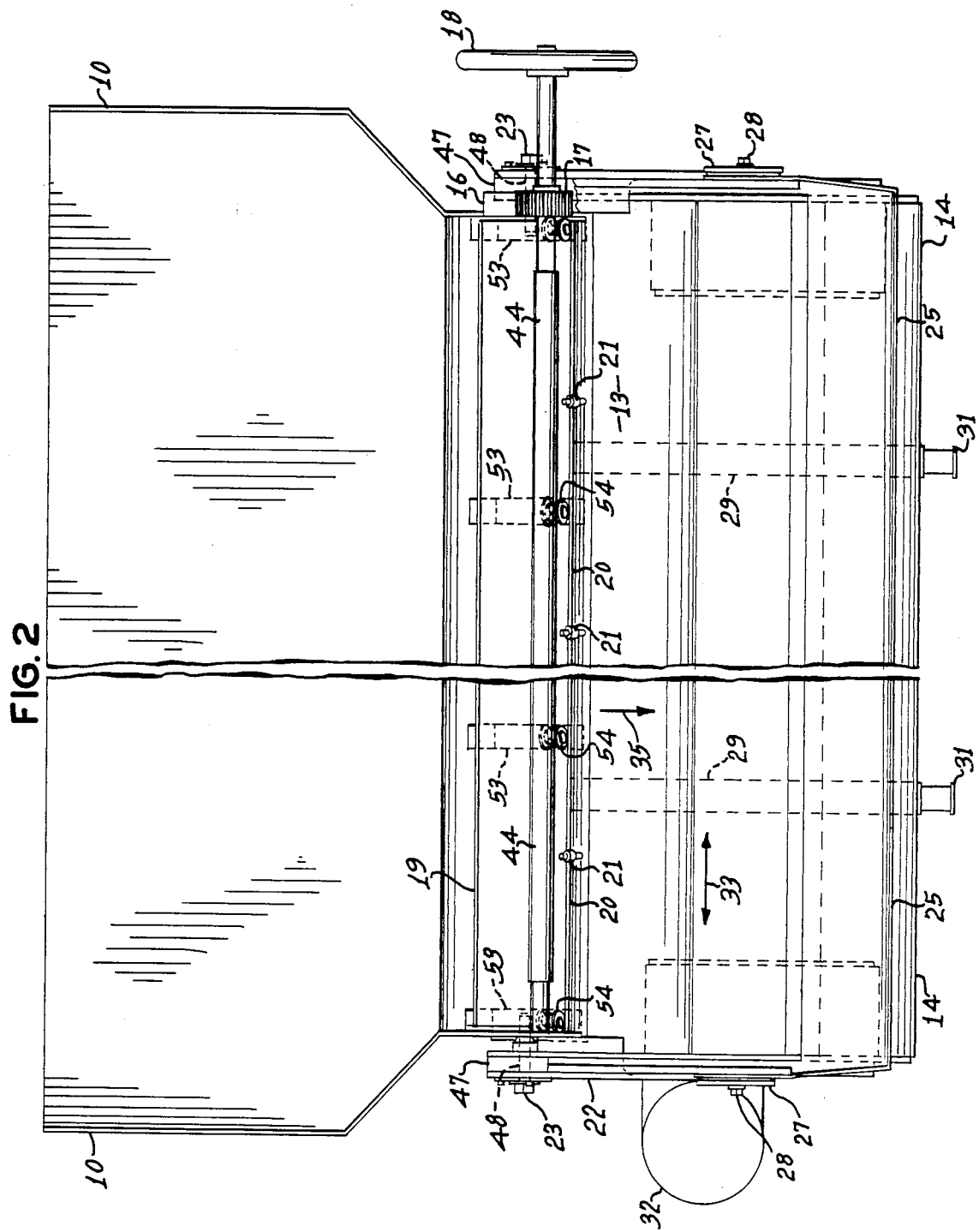
FIG. 2 is a front elevational view of the apparatus of this invention.

The components and functioning of the apparatus of this invention are best understood by reference to FIGS. 1 and 2 of the attached drawings. A hopper 10 has inclined bottom walls 11 terminating in an elongated discharge opening 12 which extends from one side to the other of hopper 10 to form an elongated rectangular slot. Particles in hopper 10 will settle by gravity to the bottom walls 11 and slide downward to discharge opening 12. Adjacently below discharge opening 12 are the upper portions 46 of inclined elongated distribution plates 13. The highest elevation of plates 13 is under discharge opening 12 and plates 13 incline downwardly in opposite directions to a lower portion 42 where the particles fall off into a collecting zone 43 which opens into inlet end 26 of vertical chute 24 having a discharge end 25. Particles leave discharge end 25 to be fed onto a moving surface which passed into an electrostatic field to cause a separation of one type of particle from another as will be explained in more detail below in connection with FIGS. 3 and 4.

Distribution plates 13 are supported by a housing 14 which is suspended from hopper 10 or its frame by plates 22 which are attached to hopper 10 by a plurality of vibration dampening members 23. Housing 14 is subjected to vibrational movements by the operation of vibratory motor 32. The vibrational movements can be effected by an eccentric weight rotated by motor 32, or by any other equivalent means. Vibration dampeners 23 are commercially available devices involving springs or rubber washers 47 around a central fixed shaft 48. Washers 47 absorb all vibration except that which moves in the direction of arrows 33, along the length of shaft 48. The purpose of the vibrational movement in the direction of arrows 33 is to spread out the particles into a thin sheet of separate particles moving down distribution plate 13 in the direction of arrow 35. The vibration reduces clumps of material to individual particles and distributes the particles evenly across the surfaces of plates 13 to provide a steady flow of particles into chute 24 and out of discharge end 25 onto a revolving drum (not shown in FIGS. 1 and 2, but shown schematically as 37, 37a and 37b in FIGS. 3 and 4). It is important to have particles on plate 13 be in a thin uniform sheet moving vertically down plate 13 from upper portion 46 to lower portion 42. An important factor in accomplishing this is the slope of plate 13. Generally it should be from about 20° to 30° below the horizontal, preferably 24°, so that gravity can cause the particles to flow downward while horizontal vibrations of plate 13 keep the particles from agglomerating in a nonuniform manner. When vibratory motor 32 is not operating, particles will not flow down plate 13 if the slope is 24° or less.

Chute 24 is affixed to hopper 10 through support member 49 in an adjustable connection so as to provide the desired flow of particles from discharge end 25. The preferred type of adjustment mechanism is that generally described in U.S. Pat. No. 4,421,148 to Knoll and Jackson involving a slotted washer 27 and a screw clamp 28 which permits the adjustment of chute 24 with respect to collection zone 43 and inlet end 26. The size of the opening in inlet end 26 can be adjusted to be accommodated to the size of particles flowing from zone 43 into chute 24. Preferably, there is a short free fall from lower end of zone 43 at feed end 26 to accelerate the particle velocity. The particle then contacts the nearly vertical wall of chute 24. Particles then leave discharge end 25 with a flight trajectory such that they will contact the surface of the separator drum (45 in FIGS. 3 and 4) at the speed of the surface of the drum and at a direction that will produce a minimum of particle bounce. These adjustments are accomplished by manipulation of washer 27 as mentioned above.

As shown in FIG. 1 the slot in slotted washer 27 is shown as being substantially horizontal and the particles flowing from discharge end 25 may be discharged substantially horizontally. However, washer 27 may be slighty rotated clockwise or counterclockwise, after first loosening and thereafter tightening screw clamp 28, thus to provide a selection of angular directions above and below or with respect to the horizontal for the discharge of particles being dispensed from discharge end 25.

The flow of particles from hopper 10 and discharge opening 12 onto distribution plates 13 is controlled by a gate valve mechanism 15 adjacent the upper portion 46 of each distribution plate 13. A gross adjustment is provided by moving feed control plate 19 toward or away from its respective distribution plate 13. Fine adjustment is provided by movement of adjustment strip 20. Feed control plate 19 is moved by handwheel 18 which turns shaft 44 on which is mounted pinion gear 17 that engages rack 16 mounted on plate 19. Feed control plate 19 is attached to a plurality of support guides 53 by a plurality of biased bolts 54 passing through slots (not shown) in plate 19 and firmly attached to guides 53. Guides 53 are rigidly attached to hopper 10. Adjustment strip 20 is mounted on and extends along the edge of feed control plate 19, but is adjustable with respect to feed control plate 19 by a screw thread bolt means 21. The flow of particles through the gate opening 52 is controlled by these adjustment means, with gate opening 52 preferably not exceeding about one inch between distribution plate 13 and the forward edge of strip 20. Screw thread bolt means 21 includes an anchor block 50 affixed to feed control plate 19 with a bolt 51 passing therethrough and engaged with a nut 55 on each side of block 50. Strip 20 is advanced or retracted by rotation of bolt 51 in nuts 55. A plurality of screw thread bolt means 21 are spaced along the length of strip 20 and are separately adjustable so as to locally distort the forward edge of strip 20 to provide a fine adjustment to make the flow of particles through gate 52 uniform.

In order to provide a processing flexibility the apparatus includes a plurality of spaced by-pass pipes 29 which extend from the discharge opening 11 of hopper 10 to below the bottom of housing 14. Pipes 29 may be plugged at the upper end when no by-pass function is desired and when all particles in hopper 10 are discharged to distribution plates 13. However, when it is desired to direct some of the particles in hopper 10 to another location for treatment or waste or the like, particles are permitted to pass into pipes 29 at upper end 30 and be conducted out lower end 31 to a receiver to a conduit leading elsewhere, or the like.

Figure 3:
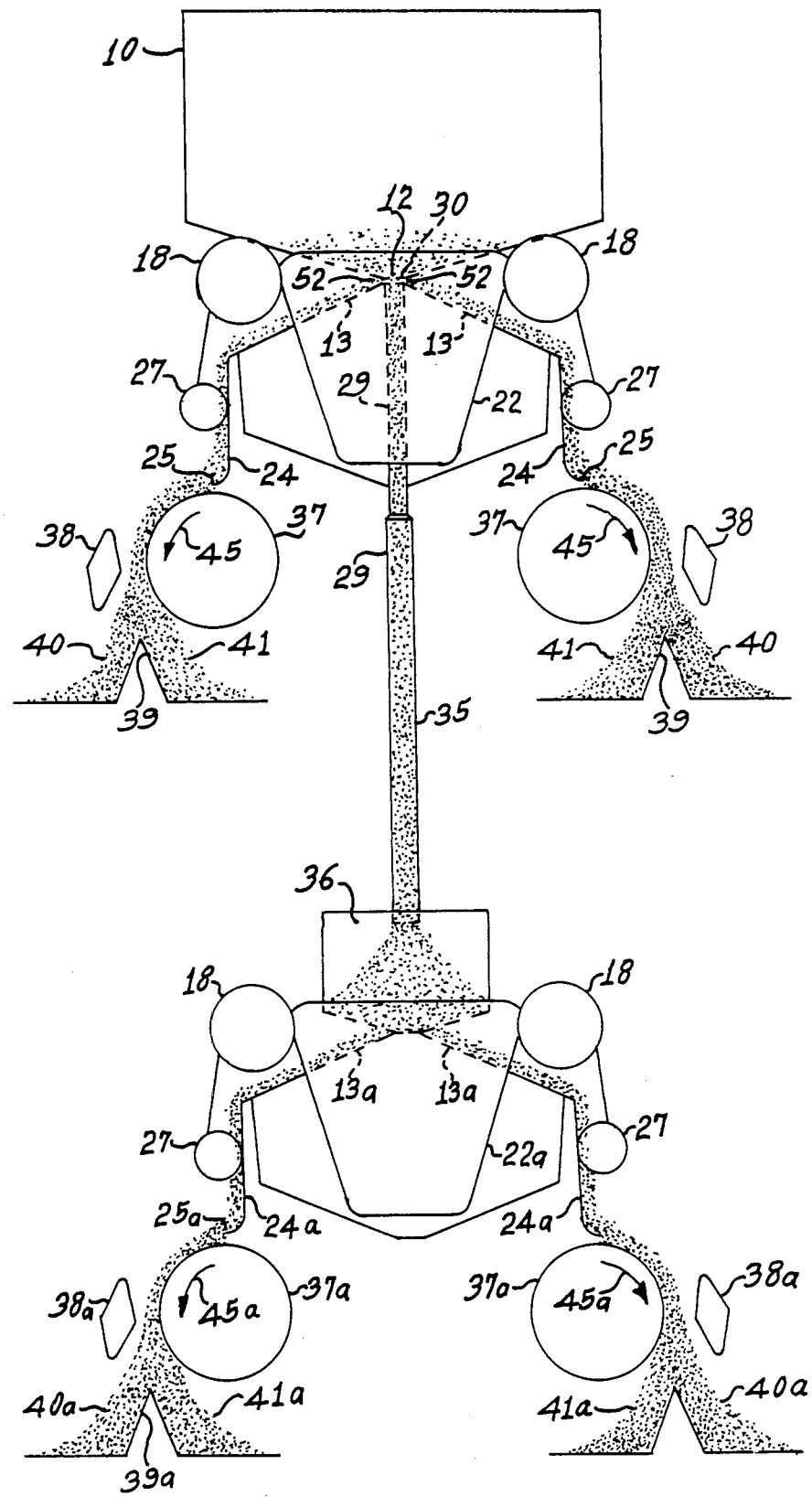
FIG. 3 is a schematic end elevational view of how the apparatus of this invention is used with an electrostatic drum separator in a parallel arrangement.

In FIG. 3 there is shown an arrangement employing the apparatus of this invention for an electrostatic separation process. Particles in hopper 10 are discharged through opening 12 and gate 52 to two vibrating distribution plates 13 and thence through chutes 24 to discharge end 25. Particles leaving discharge end 25 flow onto drums 37 rotating in the direction of arrows 45 where they pass into an electrostatic field produced by electrode 38. This causes some of the particles to be attracted toward electrode 38 and fall at 40 on the outside of splitter 39 while the remaining particles not attracted by the electrostatic field to fall at 41 on the inside of splitter 39. At the same time particles in hopper 10 are permitted to flow through by-pass pipes 29 into conduit 35 leading to a small hopper 36 on a second apparatus for feeding a second set of separators. Particles from hopper 36 flow onto vibrating distribution plates 13a, through chutes 24a, to discharge ends 25a, to drums 45a, past electrodes 38a to splitter 39a to be separated into product 40a and 41a. This illustrates a parallel arrangement using by-pass pipes 29. If electrodes 38 and 38a are similar, products 40 and 40a will be similar and products 41 and 41a will be similar.

Figure 4:
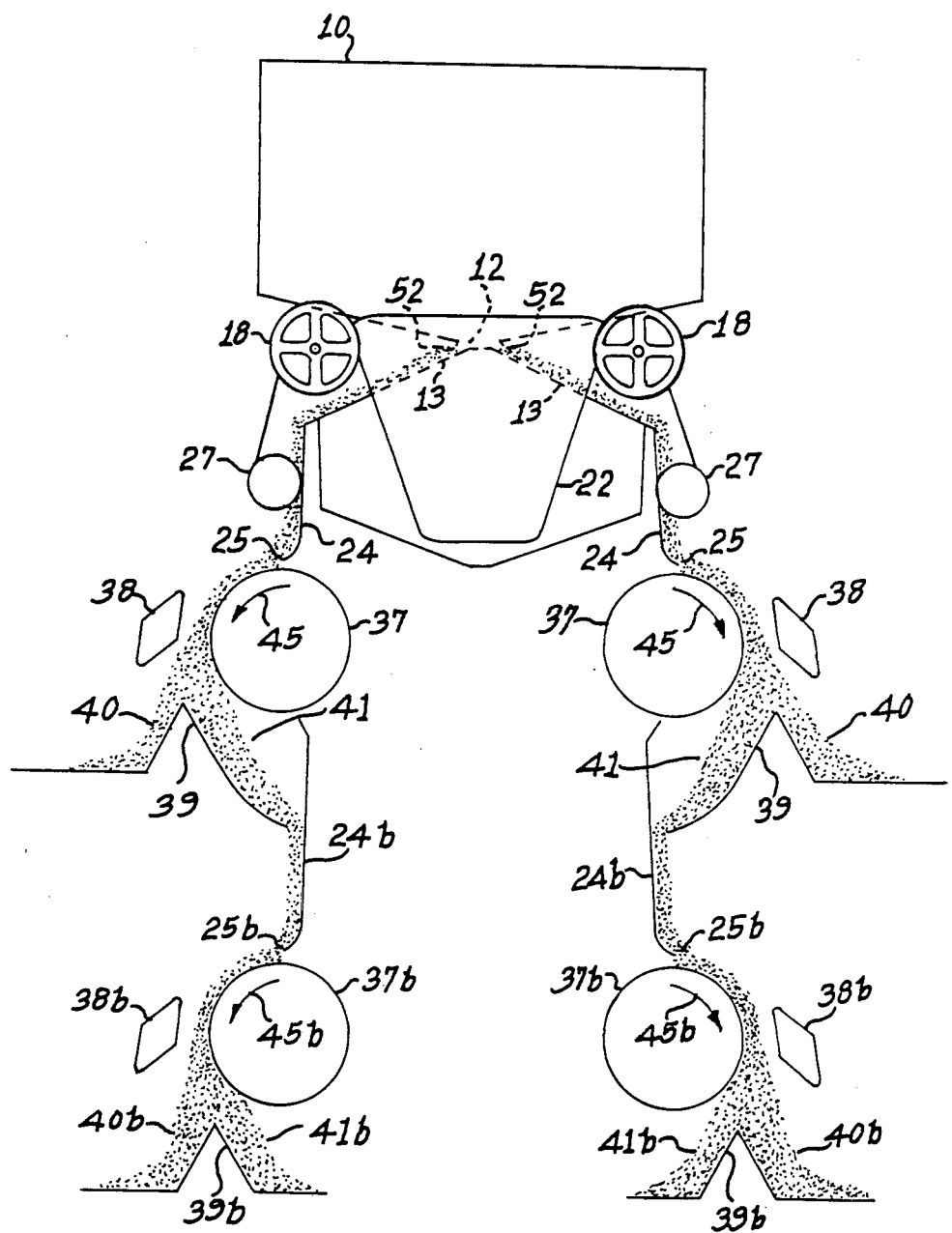
FIG. 4 is a schematic end elevational view of how the apparatus of this invention is used with an electrostatic drum separator in a series arrangement.

In FIG. 4 there is an illustration of a series arrangement wherein different products are produced by reason of step wise separations. Particles in hopper 10 flow through opening 12 and gate 52 onto vibrating distribution plates 13, to chutes 24, out discharge ends 25, to drums 37 rotating in directions 45 past electrode 38 to splitter 39 to produce products 40 and 41. This much of the procedure is identical to that described above with respect to FIG. 3. Product 41 is then conducted to chute 24b which discharges at end 25b onto drum 37b rotating in direction 45b, passes electrode 38b and is separated into two products 40b and 41b by splitter 39b. Here there are four different products, 40, 41, 40b and 41b. It is understood that there are many variations and combinations of such parallel and series procedures that can be employed to produce a variety of products.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a particle feeding apparatus for an electrostatic separator, the combination comprising a hopper with an elongated discharge slot opening defining a lateral direction in the bottom thereof, an inclined distribution plate having an upper portion coextensive with and positioned adjacently below said discharge opening and a lower portion spaced outwardly and downwardly from said upper portion, said distribution plate having side edges extending parallel to said lateral direction, an adjustable gate adjacent said discharge opening to meter the flow of particles onto said upper portion of said distribution plate, an adjustable substantially vertical chute to receive particles from said lower portion of said distribution plate and dispense particles in a generally horizontal direction onto a surface subjected to electrostatic separation forces, and means to vibrate said plate in substantially only a direction perpendicular to and laterally of the movement of particles down said plate thereby imparting lateral movement of particles to enhance uniformity of a thin sheet of particles laterally across said plate.

2. In the apparatus of claim 1 the combination further comprising a second distribution plate inclined in a direction opposite to that of said distrubution plate, respective upper portions of said distribution plates being located adjacently below said discharge opening of said hopper.

3. In the apparatus of claim 2 the combination further comprising a second vertical chute positioned to receive particles from said second distribution plate.

4. In the apparatus of claim 3 the combination further comprising a plurality of spaced bypass passageways each having an inlet end located adjacently below said discharge opening between said plate and an outlet end to dispense particles outside of said apparatus.

5. In the apparatus of claim 1 the combination wherein said adjustable gate includes a movable wall closeable against or retractable from said upper portion of said distribution plate, and means for selectively moving said wall.

6. In the apparatus of claim 5 wherein said means for selectively moving said wall includes rack and pinion gear means.

7. In the apparatus of claim 6 wherein said means for selectively moving said wall includes a plurality of spaced screw thread means.

8. In the apparatus of claim 7 wherein said wall has an elongated forward edge with said spaced screw thread means adapted to adjust the spacing between said edge and said distribution plate by locally deforming said edge adjacent each said screw thread means to provide a uniform, controlled flow of particles onto said distribution plate.

9. In the apparatus of claim 1 the combination wherein said adjustable chute has an inlet end and a discharge end and is movable to provide a free flow of particles entering said inlet end, to provide a selection of vertical distances from said lower portion of said distribution plate to said discharge end, and to provide a selection of angular directions with respect to the horizontal for the flow of particles dispensed from said discharge end.

10. In the apparatus of claim 9 further comprising a screw thread clamping member operatively connected to a slotted washer on said chute selectively permitting adjustment of said chute as described.

11. In a particle feeding apparatus for an electrostatic separator the combination comprising a hopper with an elongated discharge slot in the bottom thereof, an elongated inclined distribution plate having opposite end portions, a lower portion, and an upper portion, said upper portion being coextensive with and positioned adjacently below said discharge slot, means mounting said distribution plate to said hopper, an adjustable gate adjacent said discharge slot to meter the flow of particles onto said upper portion of said distribution plate, means mounting said adjustable gate to said hopper, an adjustable vertical chute to receive particles from said lower portion of said distribution plate and dispense said particles in a general horizontal direction onto a surface subjected to electrostatic separation forces, means mounting said chute to said hopper and vibration means connected to one of said opposite end portions to vibrate said plate in a direction longitudinally between said opposite end portions and parallel to the length of said discharge slot, a plurality of spaced vibration dampers connected between said hopper and said distribution plate for substantially permitting only vibrational movement of said plate in said longitudinal direction, said vibration means when operating causing longitudinal movement of particles to enhance uniformity of a thin sheet of particles across said plate as the particles move down said plate by gravity and when not operating causing a substantial stoppage of particle flow down said plate.

12. In the apparatus of claim 11 wherein said adjustable gate includes an elongated movable wall having an elongated edge closeable toward or retractable from said upper portion of said distribution plate, and means for selectively moving said wall edge to any desired spacing from said upper portion of said distribution plate or to completely close same thereagainst.

13. In the apparatus of claim 12 further comprising a plurality of spaced screw thread means for adjusting the spacing between said edge and said distribution plate, said edge being locally deformable by each of said plurality of screw thread means so that the flow of particles may be more uniformly controlled.

14. In the apparatus of claim 13 wherein each said spaced screw thread means includes an anchor block affixed to said means mounting said gate to said hopper, a bolt passing through said anchor block and operatively engaged with a nut on each side of said anchor block, said bolt adapted to locally deform said wall edge by selective adjustment of said bolt in said nuts.

15. In the apparatus of claim 11 wherein said means mounting said adjustable gate includes a rack and pinion gear means for selectively adjusting said gate.

16. In the apparatus of claim 11 said combination further comprising a plurality of spaced passageways each having an inlet end and an outlet end, said inlet end being positioned along said elongated discharge slot and said outlet end being positioned such that the passageway bypasses said plate and chute.

17. In the apparatus of claim 16 said combination further comprising a second distribution plate inclined in an opposite direction to said distribution plate with the upper portions of both of said plates being located adjacently below said discharge slot of said hopper.

18. In the apparatus of claim 17 said combination further comprising a second adjustable vertical chute positioned to receive particles from said second distribution plate.

19. In a particle feeding apparatus for an electrostatic separator comprising a hopper with an elongated discharge slot in the bottom thereof, an elongated distribution assembly having opposite end portions and including a pair of oppositely inclined distribution plates each being coextensive with and each having an upper portion positioned adjacently below said discharge slot, means mounting each said distribution plate to said hopper, a pair of adjustable gates adjacent said discharge slot to meter flow of particles respectively onto said upper portions of respective said distribution plates, means mounting each said adjustable gate to said hopper, a pair of adjustable vertical chutes to receive particles from the lower portions respectively of said distribution plates and to dispense said particles in a generally horizontal direction onto a surface subjected to electrostatic separation forces, means mounting each said chute to said hopper, and vibration means connected to one of said opposite end portions of said assembly to vibrate said assembly in a direction longitudinally between said opposite end portions and parallel to the length of said discharge slot, a plurality of spaced vibration dampeners mounted between said hopper and said distribution assembly for substantially permitting only vibrational movement of said assembly in said longitudinal direction, said vibration means when inoperative inhibits the flow of particles down said plate and when operative enhances the uniformity of a thin sheet of particles across said plate and movement of particles by gravity down said plate.

20. In the apparatus of claim 19 wherein each said adjustable gate includes an elongated movable wall having an elongated edge closeable toward or retractable from respective said upper portions of said distribution plates, and means for selectively moving each of said wall edges to any desired spacing respectively from said upper portions of said distribution plates or to completely close same thereagainst.

21. In the apparatus of claim 20 further comprising a plurality of spaced screw thread means for adjusting the respective spacings between said edges and said distribution plates, each said edge being locally deformable by each of said plurality of screw thread means so that the flow of particles may be more uniformly controlled.

22. In the apparatus of claim 21 wherein each said spaced screw thread means includes an anchor block affixed to said means mounting said gate to said hopper, a bolt passing through said anchor bolt and operatively connected to a nut on each side of said anchor bolt, said bolt being connected to said anchor block and adapted to locally deform said wall edge by selective adjustment of said bolt in said nuts.

23. In the apparatus of claim 19 wherein said means mounting each said adjustable gate includes a rack and pinion gear means for selectively adjusting said gate.

24. In the apparatus of claim 19 said combination further comprising a plurality of spaced passageways each having an inlet end and an outlet end, said inlet end being positioned along said elongated discharge slot and said outlet end being positioned such that the passageway bypasses said plates and chutes.

* * * * *